United States Patent [19]
Ridge

[11] Patent Number: 6,138,433
[45] Date of Patent: Oct. 31, 2000

[54] INSULATED GLASS UNIT WINDOW ASSEMBLY INCLUDING DECORATIVE THERMOPLASTIC SHEET AND METHOD FOR FORMING

[76] Inventor: Jimmy D. Ridge, 4822 County Woods La., Greensboro, N.C. 27410

[21] Appl. No.: 09/379,073

[22] Filed: Aug. 23, 1999

[51] Int. Cl.$^7$ ................................................. E04C 2/54
[52] U.S. Cl. ..................................... 52/786.11; 52/311.1
[58] Field of Search ............................. 52/311.1, 786.11

[56] References Cited

U.S. PATENT DOCUMENTS

| | | | |
|---|---|---|---|
| 1,988,964 | 1/1935 | Barrows | 20/56.5 |
| 3,121,977 | 2/1964 | Bersudsky | 50/271 |
| 3,791,095 | 2/1974 | Martin | 52/758 H |
| 3,831,319 | 8/1974 | Warner | 49/62 |
| 4,198,796 | 4/1980 | Foster | 52/203 |
| 4,204,015 | 5/1980 | Wardlaw et al. | 428/34 |
| 4,335,166 | 6/1982 | Lizardo | 52/172 |
| 4,335,170 | 6/1982 | Butler | 52/311 |
| 4,368,226 | 1/1983 | Mucaria | 52/309.13 |
| 4,438,165 | 3/1984 | Butler | 52/311 |
| 4,488,919 | 12/1984 | Butler | 52/311 |
| 4,579,756 | 4/1986 | Edgel | 428/34 |
| 4,671,031 | 6/1987 | Intengan | 52/203 |
| 4,814,213 | 3/1989 | Thorn | 428/34 |
| 4,975,307 | 12/1990 | Sollogoub | 428/34 |
| 4,997,687 | 3/1991 | Carter | 428/34 |
| 4,998,784 | 3/1991 | Freeman | 350/3.7 |
| 5,092,101 | 3/1992 | Kunert | 52/789 |
| 5,558,827 | 9/1996 | Howes | 264/220 |
| 5,571,598 | 11/1996 | Butler | 428/156 |
| 5,631,057 | 5/1997 | Sundet | 428/60 |
| 5,640,828 | 6/1997 | Reeves | 52/786.13 |
| 5,778,629 | 7/1998 | Howes | 52/786.11 |
| 5,783,264 | 7/1998 | Howes | 428/13 |
| 5,834,124 | 11/1998 | Pease, III et al. | 428/430 |
| 5,840,391 | 11/1998 | Eichhorn | 428/38 |
| 5,840,407 | 11/1998 | Futhey et al. | 428/167 |
| 5,983,593 | 11/1999 | Carbary | 52/786.11 |

FOREIGN PATENT DOCUMENTS 295 987   5/1965   Netherlands ................................. 39/7

*Primary Examiner*—Carl D. Friedman
*Assistant Examiner*—Kevin McDermott
*Attorney, Agent, or Firm*—Myers Bigel Sibley & Sajovec

[57] ABSTRACT

A decorative insulated window assembly includes first and second spaced apart, opposed, light transmissive panels and a spacer member interposed between the first and second panels such that the spacer member and the first and second panels define a chamber. A light transmissive decorative sheet is interposed between the first and second panels and within the chamber. The decorative sheet is formed of thermoplastic material and has a three-dimensional decorative pattern formed therein by vacuum forming. Preferably, the decorative sheet is not secured to any of the first and second panels and the spacer member. Preferably, the decorative sheet has a substantially uniform thickness.

37 Claims, 7 Drawing Sheets

INSULATED GLASS UNIT WINDOW ASSEMBLY INCLUDING DECORATIVE THERMOPLASTIC SHEET AND METHOD FOR FORMING

FIELD OF THE INVENTION

The present invention relates to decorative windows, and, more particularly, to insulated glass unit windows having decorative features and methods for making the same.

BACKGROUND OF THE INVENTION

Decorative windows including contoured and textured glass have long been used as decorative architectural elements. Such windows are highly desirable as wall windows, door windows, side lights and the like. Such windows are also used in commercial applications for decorative purposes and to form portions of partitions.

Traditionally decorative architectural windows have been made from relatively thick plate glass. Various sorts of grooves and other contours are ground into the glass and may be polished. The glass may be textured using sandblasting, acid etching, glue chipping (i.e., wherein adhesive is applied to a sandblasted surface and stripped to create a prescribed pattern on the glass) or other desired surface treatment. Traditional decorative windows have also been made as composites of a number of glass panels having deeply beveled edges joined by lead strips or caming.

A principle disadvantage of windows of this kind is their cost. A window of moderate size and complexity may easily cost over one thousand dollars, due particularly to the large amount of skilled labor necessary in its production. Furthermore, windows of this type have disadvantages associated with the mechanical and thermal properties of the glass. The glass may have low impact resistance, a particular problem in the case of windows having deep cuts with sharp internal corners. Glass windows having only a single layer of thickness may also present an undesirably high rate of heat transfer, resulting in increased heating and cooling costs. Also, decorative windows formed as composites of multiple glass panels cannot be used in many architectural applications because building codes require the use of safety glass windows in entry doors and load bearing walls.

SUMMARY OF THE INVENTION

The present invention is directed to an insulated window assembly having decorative features and is particularly suitable for simulating traditional windows of the type having glass panes which are grooved, beveled, camed or the like. The window assembly may be conveniently and cost-effectively manufactured, even with relatively complex decorative design features. The present invention is further directed to a method for forming such a window assembly.

According to an aspect of the present invention, a decorative insulated window assembly includes first and second spaced apart, opposed, light transmissive panels. A spacer member is interposed between the first and second panels such that the spacer member and the first and second panels define a chamber. A light transmissive decorative sheet is interposed between the first and second panels and within the chamber. The decorative sheet is formed of thermoplastic material and has a three-dimensional decorative pattern formed therein by vacuum forming.

The decorative pattern may include a groove, a bevel, frosting, etching, glue chipping, and/or marbling. A hologram may be disposed on the decorative sheet. The decorative insulated window assembly may include simulated caming secured to the decorative sheet. The decorative insulated window assembly may include a second decorative sheet interposed between the first panel and the first decorative sheet and within the chamber. The second decorative sheet may be formed of thermoplastic material and have a second three-dimensional decorative pattern formed therein by vacuum forming.

According to a further aspect of the present invention, a decorative insulated window assembly includes first and second spaced apart, opposed, light transmissive panels. A spacer member is interposed between the first and second panels such that the spacer member and the first and second panels define a chamber. A light transmissive decorative sheet is interposed between the first and second panels and within the chamber. The decorative sheet has a three-dimensional decorative pattern defined therein. The decorative sheet is not secured to any of the first panel, the second panel or the spacer member.

According to a further aspect of the present invention, a decorative insulated window assembly includes first and second spaced apart, opposed, light transmissive panels. A spacer member is interposed between the first and second panels such that the spacer member and the first and second panels define a chamber. A light transmissive decorative sheet is interposed between the first and second panels and within the chamber. The decorative sheet has a three-dimensional decorative pattern defined therein. The decorative sheet has a substantially uniform thickness.

According to a further aspect of the present invention, a method for forming a decorative insulated window assembly includes joining first and second light transmissive panels with a spacer member to form a chamber. A decorative sheet is placed between the first and second opposed panels prior to or following the step of joining the first and second panels. The decorative sheet has a three-dimensional decorative pattern formed therein by vacuum forming. The method may further include the steps of providing a light transmissive thermoplastic sheet blank and vacuum forming a three-dimensional decorative pattern in the sheet blank to form the decorative sheet.

Objects of the present invention will be appreciated by those of ordinary skill in the art from a reading of the figures and the detailed description of the preferred embodiments which follow, such description being merely illustrative of the present invention.

DETAILED DESCRIPTION OF PREFERRED EMBODIMENTS

Figure 1:
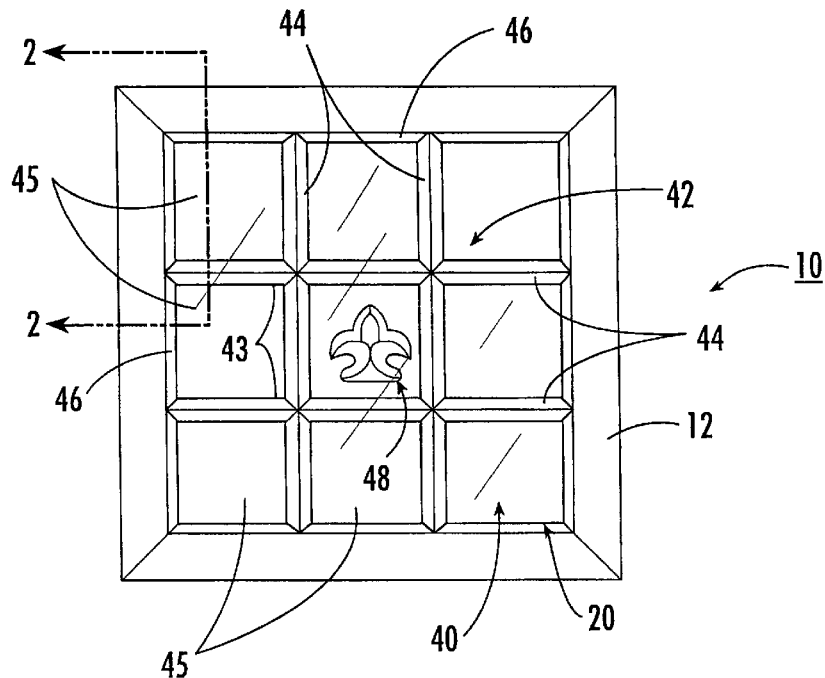
FIG. 1 is a front view of a decorative window assembly according to the present invention.

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements throughout.

As used herein, "transparent" means transmitting light such that objects beyond are clearly visible without significant distortion. As used herein, "translucent" means transmitting and diffusing light such that objects beyond are visible but cannot be clearly distinguished, i.e., partly transparent. As used herein, "light transmissive" means transmitting a significant amount of light and includes both transparent and translucent.

Figure 2:
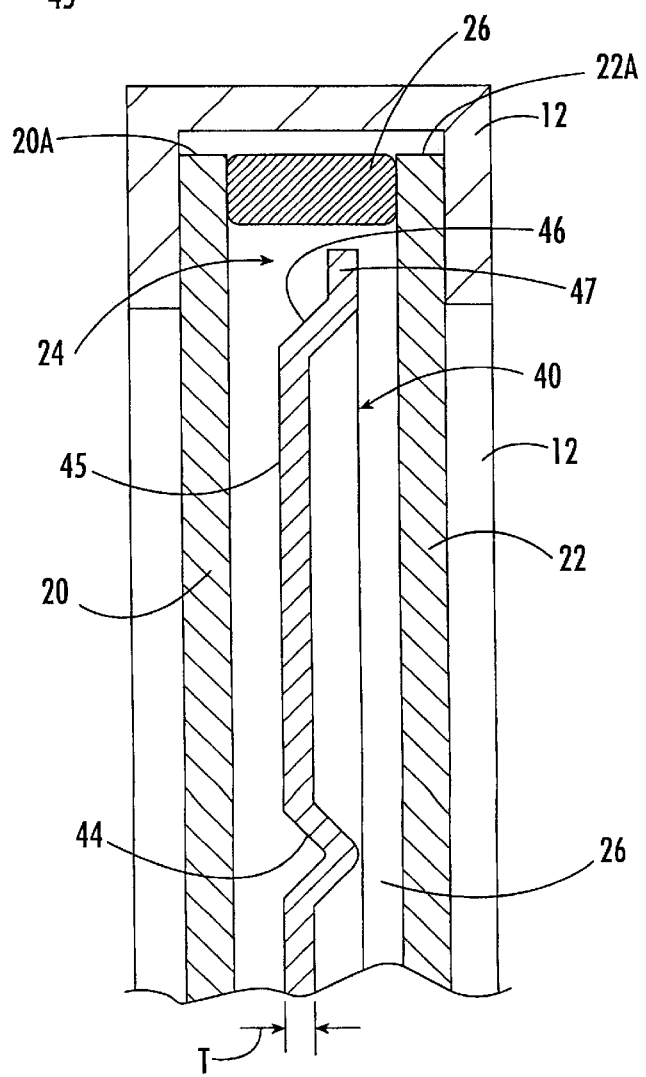
FIG. 2 is an enlarged, cross-sectional, partial view of the decorative window assembly of FIG. 1 taken along the line 2—2 of FIG. 1.

With reference to FIGS. 1 and 2, a decorative window assembly 10 according to the present invention is shown therein. Additionally, a decorative polymeric (preferably thermoplastic) sheet 40 forming a part of the assembly 10 is shown in FIG. 3.

The decorative window assembly 10 is preferably an insulated glass unit (IGU). The window assembly 10 includes a surrounding frame 12. A pair of spaced apart, opposed glass panels 20, 22 (see FIG. 2) are mounted in the frame 12. The glass panels 20, 22 may be tempered or annealed and preferably have a thickness between about 0.060 and 0.250 inch. The glass panels 20, 22 are preferably transparent and flat and smooth on each face. Alternatively, one of the glass panels 20, 22 may be a textured glass panel. The glass panels 20, 22 are joined along their peripheral edges by a suitable spacer member (e.g., a sealant strip 26 as shown). The spacer member 26 preferably functions as a seal and a connector. Any suitable spacer member may be used, such devices being well known for the manufacture of insulated glass units. Suitable devices include a SWIGGLE™ sealing strip available from Tremco of Cleveland, Ohio. Other suitable sealing devices include a metal spacer used in conjunction with a desiccant (which may be contained in the spacer) and an outer sealant coating (typically polysulfied) or strip. The frame 12, the glass panels 20, 22 and the spacer member 26 form an insulated glass unit of conventional construction and define an enclosed, sealed chamber 24. Preferably, the chamber 24 is airtight. The chamber 24 may be filled with a suitable inert gas if desired.

Figure 3:
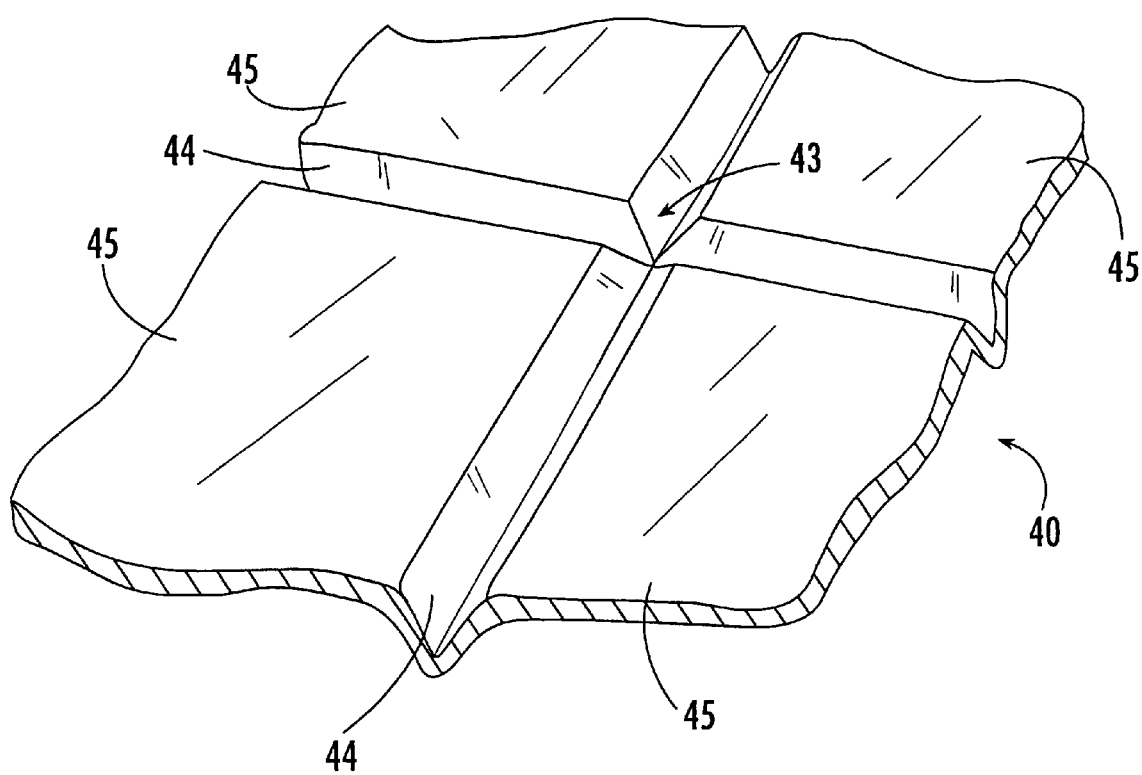
FIG. 3 is an enlarged, fragmentary, perspective view of a decorative sheet forming a part of the decorative window assembly of FIG. 1.

With reference to FIGS. 1–3, the decorative thermoplastic sheet 40 is disposed in the chamber 24 between the glass panels 20 and 22. The decorative sheet 40 is formed of a light transmissive thermoplastic material. The decorative sheet 40 is preferably formed of a transparent thermoplastic material, but may also be formed of a translucent thermoplastic material. The sheet 40 preferably extends continuously from edge to edge without apertures. A three dimensional decorative pattern 42 is formed in the sheet 40. More particularly, in the embodiment illustrated in FIGS. 1–3, the decorative pattern 42 includes vertically and horizontally extending V-shaped grooves 44 and a simulated, carved decorative emblem 48. The grooves 44 form intersections 43 and define raised panes 45. Simulated bevels 46 extend adjacent the peripheral edges of the sheet 40. An optional marginal portion 47 extends along the peripheral edge of the sheet 40 between the edges of the sheet and the bevels 46.

The decorative sheet 40 is preferably formed of polyester. Other suitable materials include ABS, acrylic, and styrene. Polyester is preferred because of its suitability for the vacuum forming process described below and because polyester generally does not significantly "out gas" as discussed below. Moreover, the polyester material is typically cost effective and readily available in forms convenient for manufacture. Suitable polyester sheet material is available from sheet manufacturers using resins available from Eastman Kodak Chemicals. The polyester material is preferably supplied as large sheets of material calendered to the chosen thickness, which may thereafter be cut to the appropriate size and shape. Preferably, the thickness T (see FIG. 2) of the sheet 40 is substantially uniform across the entirety of the sheet 40 and is between about 0.030 and 0.060 inch. That is, the thickness of the sheet material is uniform, although the overall height of the sheet may vary with the design features, for example, between the panes 45 and the grooves 44. The sheet may have relatively small variations in thickness as a result of the vacuum forming process. Preferably, variations in the thickness T due to the vacuum forming process do not exceed 0.005 inch.

Figure 4A:
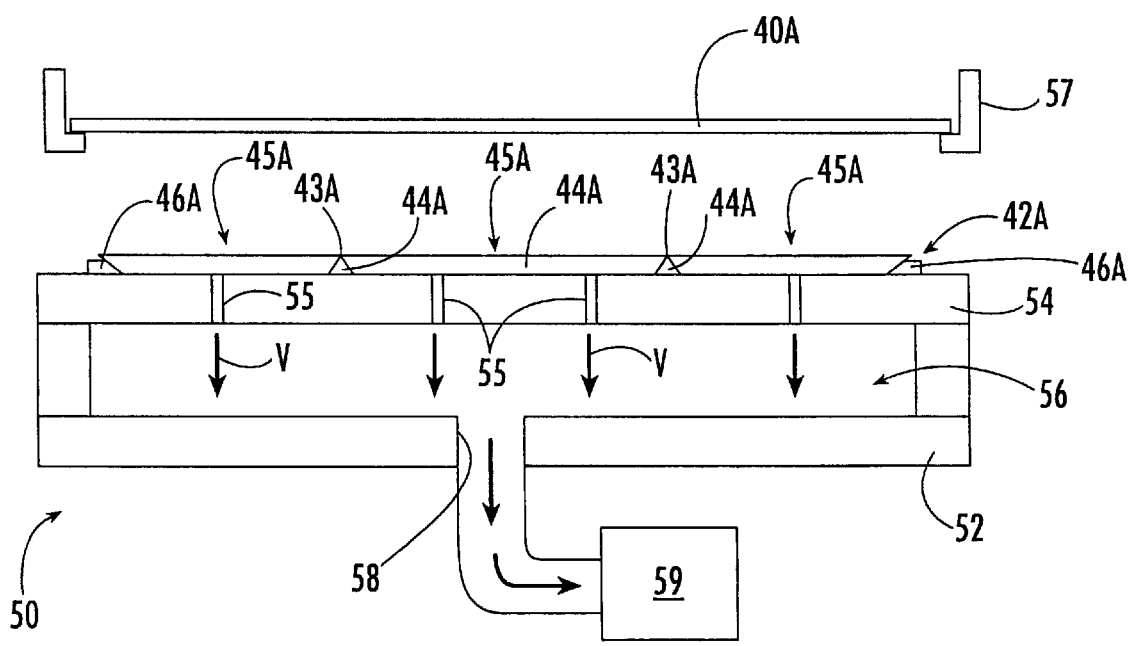
FIG. 4A is a schematic illustration of an apparatus for forming the decorative sheet of FIG. 3.

With reference to FIG. 4A, the sheet 40 is preferably formed using a vacuum forming apparatus such as the apparatus 50 illustrated schematically therein. The apparatus 50 includes a frame 52 having a table 54 and defining a chamber 56 below the table 54. A plurality of passageways 55 extend through the table 54 and communicate with the upper surface of the table 54 and the chamber 56. The passageways 55 are exaggerated in size for clarity. Preferably, the passageways 55 are between about 0.015 and 0.030 inch in diameter. A decorative pattern master 42A is secured to the upper surface of the table 54. To form the decorative pattern of the sheet 40 as illustrated, the master 42A is a reticulated framework including bars 46A corresponding to the bevels 46 and marginal portions 47, bars 44A corresponding to the grooves 44, and intersections 43A corresponding to the intersections 43. The master 42A defines voids 45A corresponding to the panes 45. The master 42A may be formed as a reverse mold of a selected original grooved glass panel, for example. A holding frame 57 holds a thermoplastic sheet blank 40A (preferably a polyester sheet as described above).

The thermoplastic sheet blank 40A is heated to a temperature sufficient to make the sheet blank 40A flexible, but not molten. Preferably, the sheet blank 40A is heated between about 300 and 375 degrees Fahrenheit. The holder frame 57 is lowered to place the sheet blank 40A on the table 54 and over the master 42A. A vacuum generator 59 provides suction through an opening 58 which in turn provides suction through the chamber 56 and the passageways 55 in the direction V. The suction through the passageways 55 pulls the flexible sheet blank 40A over the master so that the decorative pattern of the master 42A is formed in the sheet blank 40A. More particularly, the grooves 44, bevels 46 and marginal portions 47 are formed where the bars 44A and 46A of the master are present and the panes 45 are formed where the voids 45A are present such that the panes 45 of the sheet 40 will face the upper surface of the table 54. The sheet blank 40A is cooled to set the thermoplastic material. In this manner, the sheet blank 40A is shaped to form the decorative sheet 40. The decorative sheet 40 may be formed using conventional vacuum forming techniques, and suitable variations will be apparent to those of ordinary skill in the art upon a reading of the foregoing description. If necessary, the edges of the decorative sheet 40 may be trimmed. As will be apparent to those of skill in the art from the foregoing, the sheet blank 40A may take on a three-dimensional form and surface texture of any desired master.

Figure 4B:
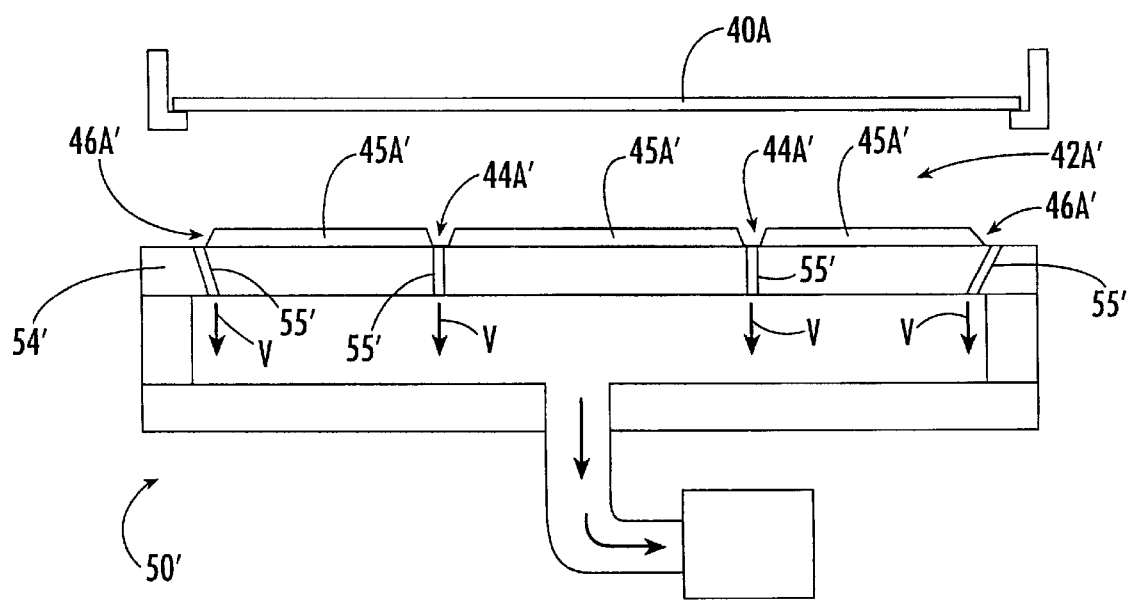
FIG. 4B is a schematic illustration of an alternative apparatus for forming the decorative sheet of FIG. 3.

As an alternative to the foregoing method and apparatus 50, the sheet 40 may be formed using an apparatus 50' as shown in FIG. 4B and a method as follows. The apparatus 50' corresponds to the apparatus 50 except that the master 42A' is differently constructed and the passageways 55' are relocated as compared to the passageways 55. The master 42A' includes a plurality of discrete pieces 45A' secured to the upper surface of the table 54'. The pieces 45A' define voids 44A' therebetween and voids 46A' about the outer periphery of the master 42A'. The sheet blank 40A is vacuum formed over the master 42A' in the same manner as described above. However, in this case, the grooves 44 are formed by the voids 44A', the bevels 46 are formed by the voids 46A' and the panes 45 are formed by the upward faces of the pieces 45A'. The passageways 55, are located at the voids 44A', 46A'.

Figure 4C:
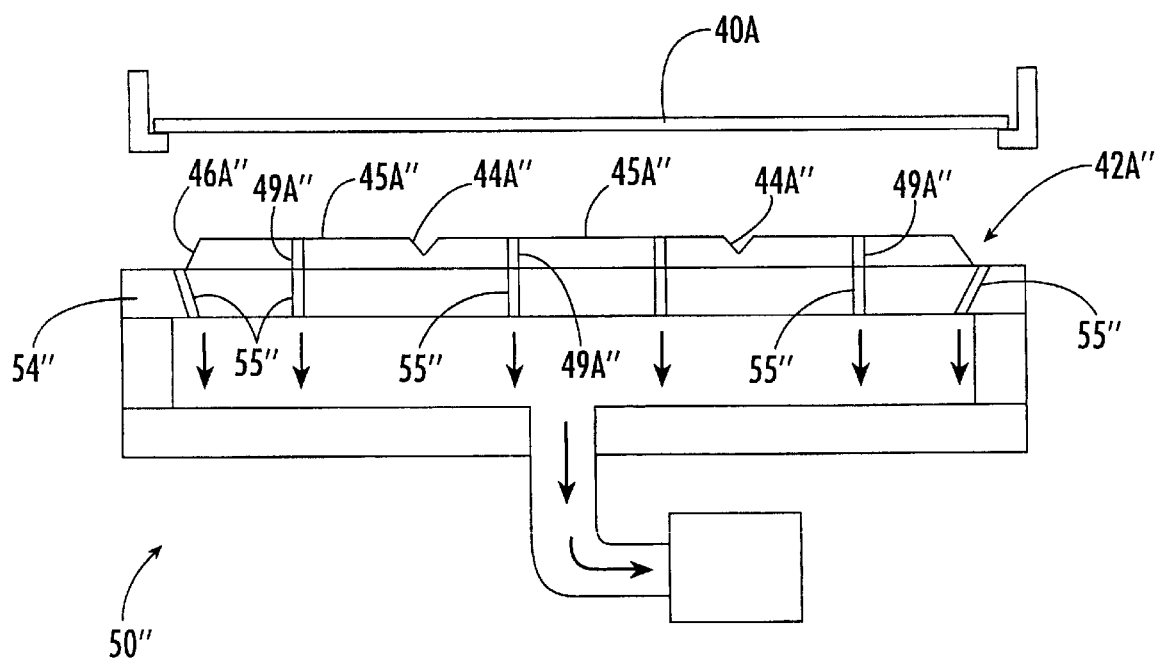
FIG. 4C is a schematic illustration of a further alternative apparatus for forming the decorative sheet of FIG. 3.

As a her alternative to the foregoing method and apparatus 50, the sheet 40 may be formed using an apparatus 50" as shown in FIG. 4C and a method as follows. The apparatus 50" corresponds to the apparatus 50' except that the master 42A" is differently constructed and the passageways 55" are relocated as compared to the passageways 55'. The master 42A" is formed of a single, relatively large sheet of suitable material. The master 42A" may be formed of glass, metal, high melt point polymer, wood or the like. It is particularly contemplated that the master 42A" may be a sheet of grooved or otherwise decorated glass which is to be simulated. The master 42A" has grooves 44A", panes 45A", and bevels 46A" corresponding to the grooves 44, panes 45, and bevels 46, respectively. Passageways 49A" are formed in the master 42A", preferably in alignment with the passageways 55" to facilitate even and adequate suction on the sheet blank 40A.

The decorative window assembly 10 may be assembled in the same manner as conventional insulated glass units, except as follows. Prior to fully installing the spacer member 26, the decorative thermoplastic sheet 40 is placed between the glass panels 20 and 22. The sheet 40 is preferably not secured to either of the glass panels 20, 22 or any other portion of the assembly 10. However, the sheet 40 may be secured in place if desired. The sheet 40 may be held in place by spacers or end clips. The sheet 40 may also be secured along one or more of its edges to the sealing member 26. The sheet 40 may contact the interior surfaces of the glass panels 20, 22. Preferably, the sheet 40 is not adhered to either of the glass panels 20, 22, however, in some applications it may be desirable to do so.

It will be appreciated that the present invention is not limited to the pattern illustrated in the figures. Using the foregoing method, decorative sheets 40 may be formed which simulate or include any desired pattern or three dimensional feature or combination of features. It is particularly contemplated that the thermoplastic decorative sheet may be formed to simulate and give the illusion of a handmade, art crafted window assembly. Even relatively complex designs may be simulated conveniently and inexpensively. In addition to the grooves and carving described above, the thermoplastic decorative sheet 40 may be formed to simulate etching, frosting, glue chipping and/or the marbling commonly employed in architectural glass blocks. A hologram may be secured to the sheet 40 such that it is visible through one or both of the glass panels 20, 22. Moreover, the thermoplastic decorative sheet 40 may simulate a plurality of glass blocks connected by simulated grout.

A portion or all of the thermoplastic decorative sheet 40 may be formed of colored material. For example, color pigments may be mixed in the polymeric material of the sheet 40. Also, a colored ink may be printed (for example, by screen printing) or painted onto a portion or all of the thermoplastic decorative sheet 40.

The thermoplastic decorative sheets and/or the decorative window assemblies according to the present invention may be formed in any suitable shape (e.g., square, rectangular, triangular, circular, oval, etc.). Preferably, as in the case of the illustrated sheet 40, the thermoplastic decorative sheet extends continuously from edge to edge without apertures. However, it is contemplated that apertures may be provided in the sheet as well.

The decorative window assembly 10 may be used in any application where decorative windows are used, and also in applications where original decorative glass windows may not be desirable. The assembly 10 may be used in windows, door lights, side lights, doors, room dividers, furniture, cabinets, and commercial refrigerators (front and top opening), for example. The decorative window assembly 10 provides a particular advantage as compared to traditional decorative windows in that the only surfaces exposed to the exterior are the outer surfaces of the glass panels 20, 22. The glass panels are resistant to scratching and, because they are smooth, are easy to clean. In some applications, particularly indoor applications such as furniture and cabinets, the spacer member 26 may be omitted and the sheet 40 may serve to space the glass panels 20, 22. The frame 12 may be a separate frame as shown or may be integrally formed with the furniture.

Figure 5:
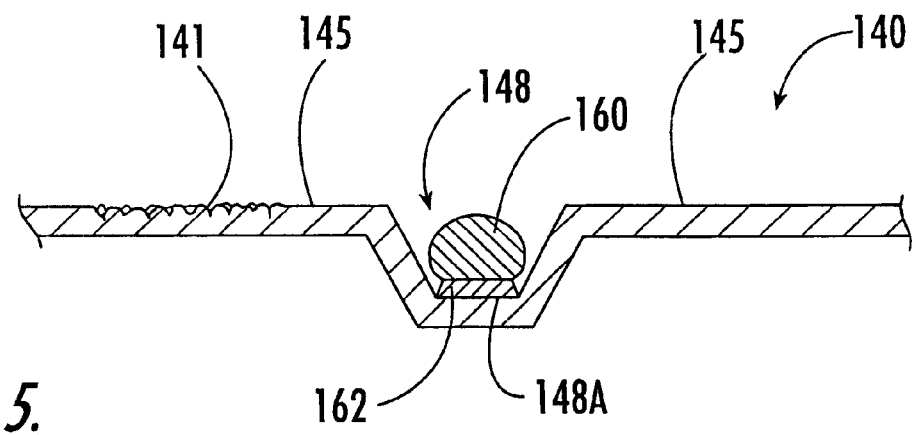
FIG. 5 is an enlarged, fragmentary, cross-sectional view of a decorative sheet according to a further embodiment of the present invention.

With reference to FIG. 5, a decorative window assembly according to the present invention may include simulated caming. The simulated caming may simulate caming of the type interposed between panes of traditional leaded glass windows, for example. According to a further embodiment, a thermoplastic decorative sheet 140 corresponding to the sheet 40 includes a flat bottomed, V-shaped groove 148 defining panes 145. The groove 148 has a flat bottom surface 148A. A strip of simulated caming 160 is positioned in the groove 148 and secured to the bottom wall 148A by a suitable adhesive 162. The simulated caming strip 160 may be metal, plastic or other inert materials. The sheet 140 also has simulated frosting 141 (e.g., as may be formed on traditional glass panels by etching or sandblasting) formed on one of the panes 145. The simulated frosting 141 may be formed by engaging the sheet blank 40A with a master having a frosted surface in the vacuum forming process. The sheet 140 with the simulated caming 160 and frosting 141 may be used in a window assembly as described above.

Figure 6:
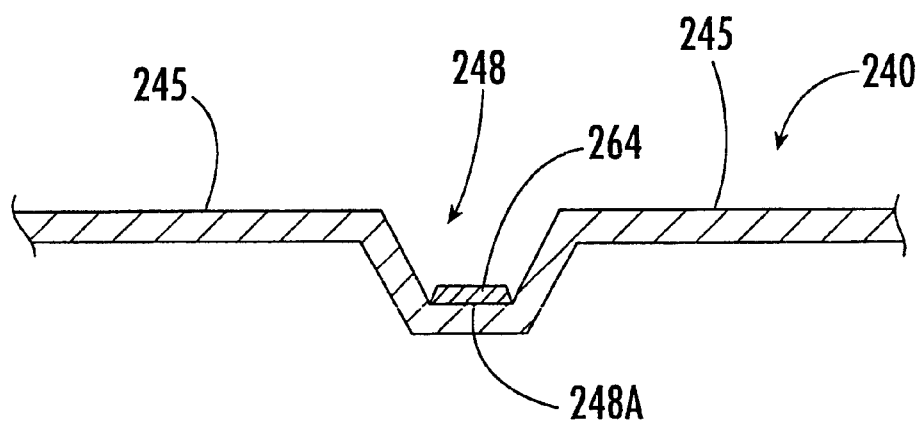
FIG. 6 is an enlarged, fragmentary, cross-sectional view of a decorative sheet according to a further embodiment of the present invention.

With reference to FIG. 6, a thermoplastic decorative sheet 240 according to a further embodiment includes a groove 248 defining panes 245. An ink or paint 264 simulating caming coats the bottom wall 248A of the groove 248. The ink or paint 264 may be applied to the bottom wall 248A by any suitable means. For example, the ink or paint may be applied by screen printing, painting or using a marker. It is particularly contemplated that the ink or paint 264 may have a gold tint (simulating gold leaf) or other metallic tint.

Figure 7:
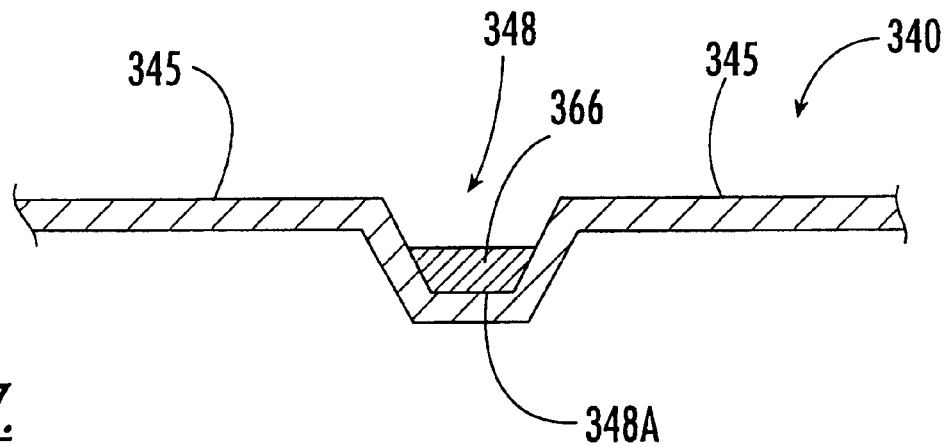
FIG. 7 is an enlarged, fragmentary, cross-sectional view of a decorative sheet according to a further embodiment of the present invention.

With reference to FIG. 7, a thermoplastic decorative sheet 340 according to a further embodiment includes a groove 348 having a flat bottom 348A and defining simulated panes 345. A solidified resin 366 is disposed in the bottom of the groove 348. The resin 366 may be applied by pouring the liquid, uncured resin into the groove, allowing the resin to settle, and thereafter curing the resin. It is particularly contemplated that the resin 366 may have a gray tint to simulate lead caming. Suitable resin materials include colored liquid polyester, polyurethane, etc.

Figure 8:
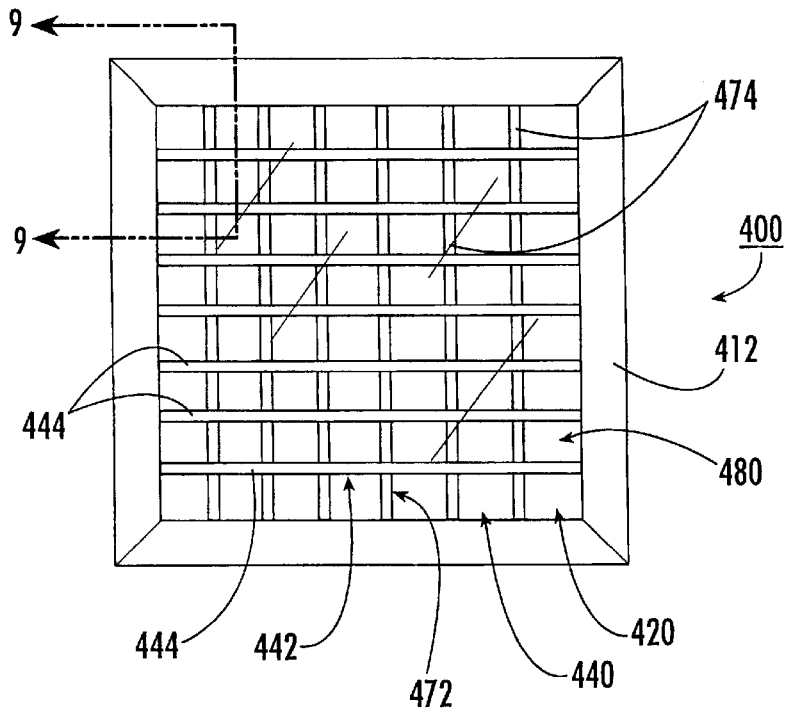
FIG. 8 is a front view of a decorative window assembly according to a further embodiment according to the present invention.
Figure 9:
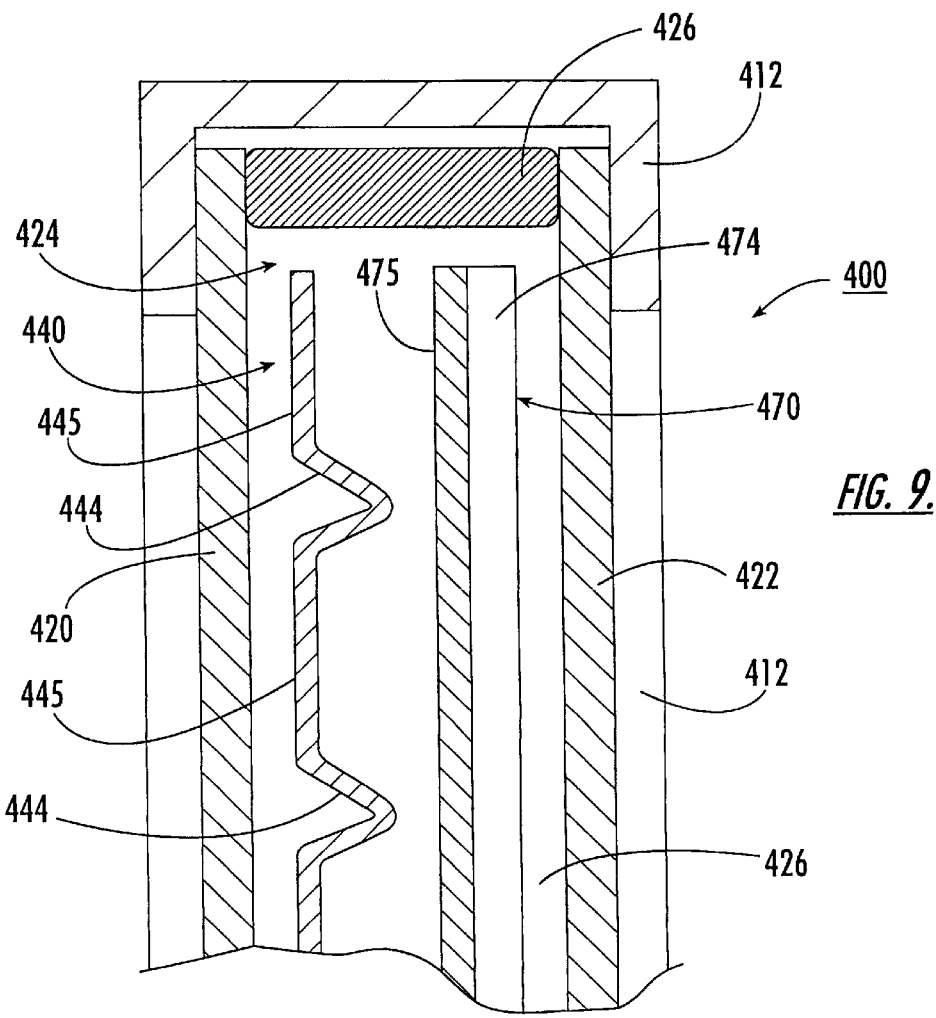
FIG. 9 is an enlarged, cross-sectional, partial view of the decorative window assembly of FIG. 8 taken along the line 9—9 of FIG. 8.

With reference to FIGS. 8 and 9, a decorative window assembly 400 according to a further embodiment is shown therein. The assembly 400 includes elements 412, 420, 422, 424 and 426 corresponding to elements 12, 20, 22, 24 and 26 of the decorative window assembly 10. The assembly 400 has a first decorative thermoplastic sheet 440 and a second decorative thermoplastic sheet 470 disposed in the chamber 424. The decorative sheets 440 and 470 are preferably formed in the manner described above with regard to the decorative sheet 40. The decorative window assembly 400 is preferably assembled in the same manner as described above for the assembly 10, except that both of the sheets 440 and 470 are placed between the glass panels 420 and 422.

The decorative sheets 440 and 470 have complimentary three dimensional decorative patterns 442 and 472, respectively. The decorative pattern 442 includes horizontal grooves 444 and the decorative pattern 472 includes vertical grooves 474. The decorative patterns 442 and 472 together present a combined decorative pattern 480 when viewed from the front or rear of the assembly 400. In particular, the decorative pattern 480 may simulate the pattern of conventional glass blocks of the type having first vertical ribs on one interior surface and second, horizontal ribs on another, opposed interior surface of the block, thereby providing a prismatic effect.

Each of the patterns and features as described above may be used in a decorative window assembly having multiple thermoplastic decorative sheets. Also, more than two thermoplastic decorative sheets may be employed in a given decorative glass assembly according to the present invention.

The decorative window assemblies of the present invention provide a number of significant advantages over prior art methods for providing decorative insulated glass unit windows. The decorative window assemblies of the present invention provide insulated glass units simulating original glass windows having desired decorative features such as grooves, bevels, etching, glue chipping, carving and the like. Because the assemblies have the strength and durability of the outer glass panels, the window assemblies are versatile and may be used in a wide variety of applications. The vacuum forming process allows the thermoplastic decorative sheets to be cost effectively formed in virtually any desired decorative pattern. Moreover, the cost of forming the window assemblies according to the present invention may be substantially less than the cost to form decorative glass windows and panels using other methods for simulating decorative glass panels and windows.

The use of a polyester material for the thermoplastic decorative sheets is also particularly advantageous. Other plastic materials may emit a gas over time which would tend to cloud the interior of the glass panels of an insulated glass unit. This "out gassing" phenomenon would cause the insulated glass unit to be untenable for most uses.

It is also contemplated that decorative polymeric sheets corresponding to the sheet 40 but which are formed by techniques other than vacuum forming may be used in conjunction with others of the inventive aspects described herein. For example, the decorative sheet may be formed by molding a thermoplastic or thermoset material. However, formation of the decorative sheet by vacuum forming is preferred for the reasons discussed above.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A decorative insulated window assembly comprising:
   a) first and second spaced apart, opposed, light transmissive panels;
   b) a spacer member interposed between said first and second panels such that said spacer member and said first and second panels define a chamber;
   c) a light transmissive decorative sheet interposed between said first and second panels and within said chamber, said decorative sheet being formed of thermoplastic material and having a three-dimensional decorative pattern formed therein by vacuum forming: and
   d) wherein said decorative sheet has a substantially uniform thickness.

2. The decorative insulated window assembly of claim 1 wherein said decorative sheet is not secured to either of said first and second panels.

3. The decorative insulated window assembly of claim 2 wherein said decorative sheet is not secured to said spacer member.

4. The decorative insulated window assembly of claim 1 wherein said chamber is substantially air tight.

5. The decorative insulated window assembly of claim 1 wherein said first and second panels are formed of glass.

6. The decorative insulated window assembly of claim 1 wherein said substantially uniform thickness of said decorative sheet is between about 0.030 and 0.060 inch.

7. The decorative insulated window assembly of claim 1 wherein said decorative sheet is formed of polyester.

8. The decorative insulated window assembly of claim 1 wherein said decorative pattern includes at least one simulated design element selected from the group consisting of a groove, a bevel, frosting, etching, glue chipping, and marbling.

9. The decorative insulated window assembly of claim 1 including a hologram disposed on said decorative sheet.

10. The decorative insulated window assembly of claim 1 including a decorative coating on a surface of said decorative sheet.

11. The decorative insulated window assembly of claim 1 including simulated caming secured to said decorative sheet.

12. The decorative insulated window assembly of claim 11 wherein said decorative pattern includes a groove and said simulated caming is secured to said decorative sheet within said groove.

13. The decorative insulated window assembly of claim 11 wherein said simulated caming includes a strip adhered to said decorative sheet.

14. The decorative insulated window assembly of claim 11 wherein said simulated caming includes an ink coating on said decorative sheet.

15. The decorative insulated window assembly of claim 11 wherein said simulated caming includes a resin bonded to said decorative sheet.

16. A decorative insulated window assembly comprising:
   a) first and second spaced apart, opposed, light transmissive panels;
   b) a spacer member interposed between said first and second panels such that said spacer member and said first and second panels define a chamber;
   c) a light transmissive first decorative sheet interposed between said first and second panels and within said chamber said first decorative sheet being formed of thermoplastic material and having a first three-dimensional decorative pattern formed therein by vacuum forming; and
   d) a second decorative sheet interposed between said first panel and said first decorative sheet and within said chamber, said second decorative sheet being formed of thermoplastic material and having a second three-dimensional decorative pattern formed therein by vacuum forming.

17. The decorative insulated window assembly of claim 16 wherein said first and second three-dimensional decorative patterns are different.

18. A decorative insulated window assembly comprising:
   a) first and second spaced apart, opposed, light transmissive panels;
   b) a spacer member interposed between said first and second panels such that said spacer member and said first and second panels define a chamber; and
   c) a light transmissive decorative sheet interposed between said first and second panels and within said chamber, said decorative sheet having a three-dimensional decorative pattern defined therein, wherein said decorative sheet is not secured to any of said first panel, said second panel and said spacer member and is free to move within said chamber in all directions.

19. A decorative insulated window assembly comprising:
   a) first and second spaced apart, opposed, light transmissive panels;
   b) a spacer member interposed between said first and second panels such that said spacer member and said first and second panels define a chamber; and
   c) a light transmissive decorative sheet interposed between said first and second panels and within said chamber, said decorative sheet having a three-dimensional decorative pattern defined therein, wherein said decorative sheet has a substantially uniform thickness.

20. The decorative insulated window assembly of claim 19 wherein said substantially uniform thickness of said decorative sheet is between about 0.030 and 0.060 inch.

21. The decorative insulated window assembly of claim 19 wherein said decorative sheet is not secured to any of said first panel, said second panel and said spacer member.

22. The decorative insulated window assembly of claim 19 wherein said decorative pattern includes at least one simulated design element selected from the group consisting of a groove, a bevel, frosting, etching, glue chipping, and marbling.

23. The decorative insulated window assembly of claim 19 including a hologram disposed on said decorative sheet.

24. A decorative insulated window assembly comprising:
   a) first and second spaced apart, opposed, transparent glass panels;
   b) a spacer member interposed between said first and second panels such that said spacer member and said first and second panels define a substantially air tight chamber; and
   c) a light transmissive decorative sheet interposed between said first and second panels and within said chamber, said decorative sheet having a substantially uniform thickness, said decorative sheet being formed of thermoplastic material and having a three-dimensional decorative pattern formed therein by vacuum forming, wherein said decorative sheet is not secured to any of said first panel, said second panel and said spacer member and is free to move within said chamber in all directions.

25. The decorative insulated window assembly of claim 24 wherein said substantially uniform thickness of said decorative sheet is between about 0.030 and 0.060 inch.

26. The decorative insulated window assembly of claim 24 wherein said decorative sheet is formed of polyester.

27. The decorative insulated window assembly of claim 24 wherein said decorative pattern includes at least one simulated design element selected from the group consisting of a groove, a bevel, frosting, etching, glue chipping, and marbling.

28. The decorative insulated window assembly of claim 24 including a hologram disposed on said decorative sheet.

29. The decorative insulated window assembly of claim 24 including a decorative coating on a surface of said decorative sheet.

30. The decorative insulated window assembly of claim 24 including simulated caming secured to said decorative sheet.

31. A decorative insulated window assembly comprising:
   a) first and second spaced apart, opposed, transparent glass panels;
   b) a spacer member interposed between said first and second panels such that said spacer member and said first and second panels define a substantially air tight chamber;
   c) a light transmissive first decorative sheet interposed between said first and second panels and within said chamber, said first decorative sheet having a substantially uniform thickness, said first decorative sheet being formed of thermoplastic material and having a first three-dimensional decorative pattern formed therein by vacuum forming, wherein said first decorative sheet is not secured to any of said first panel, said second panel and said spacer member; and d) a second decorative sheet interposed between said first panels and said first decorative sheet and within said chamber, said second decorative sheet being formed of thermoplastic material and having a second three-dimensional decorative pattern formed therein by vacuum forming.

32. A decorative insulated window assembly comprising:
a) first and second spaced apart, opposed, light transmissive panels defining a chamber therebetween; and
b) a light transmissive decorative sheet interposed between said first and second panels and within said chamber, said decorative sheet being formed of thermoplastic material and having a three-dimensional decorative pattern formed therein by vacuum forming, wherein said decorative sheet is not directly secured to either of said first panel and said second panel and is free to move within said chamber in all directions.

33. A decorative insulated window assembly comprising:
a) first and second spaced apart, opposed, light transmissive panels defining a chamber therebetween;
c) a light transmissive first decorative sheet interposed between said first and second panels and within said chamber, said first decorative sheet being formed of thermoplastic material and having a first three-dimensional decorative pattern formed therein; and
d) a second decorative sheet interposed between said first panel and said first decorative sheet and within said chamber, said second decorative sheet being formed of thermoplastic material and having a second three-dimensional decorative pattern formed therein.

34. The decorative insulated window assembly of claim 33 wherein said first and second three-dimensional decorative patterns are different.

35. The decorative insulated window assembly of claim 33 wherein each of said first and second sheets has a substantially uniform thickness.

36. The decorative insulated window assembly of claim 33 wherein said first and second three-dimensional decorative patterns are formed is said first and second sheets by vacuum forming.

37. The decorative insulated window assembly of claim 33 wherein said first and second decorative sheets are not directly secured to either of said first panel and said second panel and are free to move within said chamber in all directions.

* * * * *